United States Patent
Kovacs

(10) Patent No.: US 8,432,798 B2
(45) Date of Patent: Apr. 30, 2013

(54) OVERLOAD CONTROL IN A QUALITY-OF-SERVICE-AWARE TELECOMMUNICATIONS NETWORK

(75) Inventor: Benedek Kovacs, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 241 days.

(21) Appl. No.: 13/055,506

(22) PCT Filed: Jul. 24, 2008

(86) PCT No.: PCT/EP2008/059693
§ 371 (c)(1), (2), (4) Date: Mar. 28, 2011

(87) PCT Pub. No.: WO2010/009764
PCT Pub. Date: Jan. 28, 2010

(65) Prior Publication Data
US 2011/0170409 A1    Jul. 14, 2011

(51) Int. Cl.
*H04L 1/00* (2006.01)
(52) U.S. Cl.
USPC .......................................... 370/230; 370/235
(58) Field of Classification Search .......... 370/229–236, 370/252, 254
See application file for complete search history.

(56) References Cited

U.S. PATENT DOCUMENTS

| | | | | |
|---|---|---|---|---|
| 5,274,644 | A * | 12/1993 | Berger et al. | 370/230 |
| 5,583,857 | A | 12/1996 | Soumiya et al. | |
| 7,197,564 | B1 | 3/2007 | Bhoj et al. | |
| 2002/0159576 | A1 * | 10/2002 | Adams | 379/133 |
| 2004/0013089 | A1 | 1/2004 | Taneja et al. | |
| 2004/0165528 | A1 | 8/2004 | Li et al. | |
| 2007/0008882 | A1 | 1/2007 | Oran | |
| 2008/0267064 | A1 * | 10/2008 | Broadhurst et al. | 370/230 |
| 2010/0008227 | A1 * | 1/2010 | Szabo et al. | 370/235.1 |
| 2010/0149973 | A1 * | 6/2010 | Krupp et al. | 370/230 |
| 2010/0165844 | A1 * | 7/2010 | Pongracz et al. | 370/235 |

FOREIGN PATENT DOCUMENTS

EP   0 673 138   9/1995

OTHER PUBLICATIONS

ETSI TR 182 015 V1.1.1, Telecommunications and Internet converged Services and Protocols for Advanced Networking (TISPAN); Next Generation Networks; Architecture for Control of Processing Overload, 54 pages, 2006.*
International Search Report for PCT/EP2008/059693, mailed Mar. 31, 2009.
Written Opinion for PCT/EP2008/059693, mailed Mar. 31, 2009.
International Preliminary Report on Patentability for PCT/EP2008/059693, dated Oct. 14, 2010.
Anderson et al., "Modelling and Design of Admission Control Mechanisms for Web Servers using Non-linear Control Theory", *Performance and Control of Next-Generation Communication Networks*, Sep. 2003, pp. 1-12.

(Continued)

*Primary Examiner* — Frank Duong
(74) *Attorney, Agent, or Firm* — Nixon & Vanderhye, P.C.

(57) ABSTRACT

A method of controlling overload in a telecommunications network (e.g. a Next Generation Network) is described. A series of offers are sent from one or more source nodes to a throttle. An admission decision is carried out at the throttle for each offer, the outcome of the admission decision determining whether or not that offer should be admitted into the network. For each offer, if the admission decision is to admit the offer, it is sent from the throttle towards a target node in the network. Each offer belongs to a traffic class selected from a set of traffic classes. The throttle identifies the traffic class of each offer and the admission decision for each offer takes into account the traffic class of that offer according to a Service Level Agreement.

31 Claims, 4 Drawing Sheets

OTHER PUBLICATIONS

Prior et al., "End-to-End QoS with Scalable Reservations", *11th International Conference on Telecommunications Systems*, Oct. 2003, pp. 1-14.

ITU-T Recommendation H.248.2, "Gateway Control Protocol: Facsimile, Text Conversation and Call Discrimination Packages", Series H: Audiovisual and Multimedia Systems; (Jan. 2005).

* cited by examiner

OVERLOAD CONTROL IN A QUALITY-OF-SERVICE-AWARE TELECOMMUNICATIONS NETWORK

This application is the U.S. national phase of International Application No. PCT/EP2008/059693 filed 24 Jul. 2008 which designated the U.S., the entire contents of which is hereby incorporated by reference.

TECHNICAL FIELD

The present invention relates to overload control in a telecommunications network. In particular, although not exclusively, the invention relates to overload control in a Next Generation Network (NGN).

BACKGROUND

Next Generation Networking is a broad term to describe architectural evolution in telecommunication core and access networks. The general idea behind NGN is that one network transports all information and services (e.g. voice, data, and media such as video) by encapsulation into packets, in a similar manner to that used on the Internet. NGNs are commonly built around the Internet Protocol. Thus an NGN is a packet-based network which can provide services including telecommunications, which is able to make use of multiple broadband, QoS-enables transport technologies, and in which service-related functions are independent from underlying transport-related technologies.

In NGNs, many protocols such as, for example, H.248 (also known as Gateway Control Protocol) are used for controlling the media setup of a call. Protocol messages are processed on the central processing unit (CPU) of corresponding nodes.

Different types of nodes have different signal processing capacity, and some nodes have significantly higher capacity than others. Because of this it is possible to envisage scenarios in which there is a high probability of signalling overload in a specified target node caused by a source node. This may occur, for example, if the signal processing capacity of the target node is significantly lower than that of the source node.

Signalling overload causes system performance degradation even if the target node is able to protect itself by rejecting offers. External overload control mechanisms have therefore been developed to restrict in advance the traffic which can be offered to the target node. Such overload control mechanisms are generally operated by the source node. Call-gapping algorithms are used to decide whether each offer should be sent out to the target.

Where the characteristics of the desired maximum offer throughput are known (determined as part of the external overload control) the decision logic in the source node is referred as a "throttle". FIG. 1 illustrates the architecture of an external overload control between a source node 101 and target node 102. Offers 103 are sent from the source node 101 and information 104 is returned from the target node 102 towards the source node 101. A throttle 105 is operated by the source node 101 to restrict the flow of offers.

The external overload control mechanism can itself control different types of descriptors of the traffic flows in the system. For example, Windows-based systems control message turn-around time with a throttle limiting the number of offers in the system. Other systems operate by restricting a percentage of offers compared to a previous time period. Many others, such as for example the arrangement described in H.248.11, control the rate of offers and use a "token bucket" as a throttle, as described in more detail below.

The typical requirements that an offer rate limiting throttle must fulfil are as follows:

[Req-1a:] The rate of the offers sent out should be limited according to the rate determined by other parts of the external overload control.

[Req-1b]: An offer should always be sent out once the limit is not violated.

[Req-2]: When only one offer can be sent out and there are two candidates, the one with higher priority should always be sent out.

[Req-3]: When different traffic classes are defined (on the same priority level) and there are candidates not to be sent out because of the limitations, then the offer rate representing the resource should be split according to some defined agreements between the traffic classes (Service level Agreements).

The problem with these requirements is that, once they are put into a real system environment, it is very hard to decide whether or not they are met. Furthermore, different interpretations are possible, and it can even be envisaged that in certain circumstances it is not possible for all of them to be satisfied at the same time.

There are some solutions in existence that solve some of the requirements outlined above. For example, H.248.11 describes a Token Bucket system (although it will be noted that this is defined as a Leaky Bucket in the standard; however the behaviour described is that of a Token Bucket). In the Token Bucket system, the bucket can be seen as an abstract container that holds aggregate network traffic to be transmitted. The bucket contains "tokens", each of which can represent a unit of bytes or a single packet of predetermined size. Tokens are added to the bucket at a predetermined rate until the bucket is full. Tokens in the bucket are effectively "cashed in" (removed) for the ability to send a packet. The network administrator specifies how many tokens are needed to transmit how many bytes. When tokens are present, a flow is allowed to transmit traffic. If there are no tokens in the bucket, a flow cannot transmit its packets. Therefore, a flow can transmit traffic up to its peak burst rate if there are adequate tokens in the bucket and if the burst threshold is configured appropriately.

The Token Bucket is characterised by a "watermark level" (the maximum peak burst rate; this can also be thought of as the capacity of the bucket) and the maximal offer rate (the rate at which tokens are added to the bucket).

Using this system, the average rate of flow of traffic is kept below a predetermined maximum (the maximal offer rate). In addition, the watermark ensures a maximum allowed peak in traffic. The setting of the watermark parameter determines how likely it is that the bucket produces high throughput rates for short times (which might violate req-1a above) or does not send out candidates even though the rate limit is not violated (which would violate req-1b).

The Token Bucket system does allow for priority handling. Different watermarks are applied for the different priority levels, so the throughput characteristics are different for different priorities: calls with higher priority cause higher peaks in traffic. This addresses req-2.

However, the Token Bucket system does not handle traffic classification, and therefore cannot deal with Service Level Agreements. Req-3 is therefore not addressed.

Other methods, such as Weighted Fair Queuing, address the classification issues of req-3. However, such methods place offers in queues and thus cause delay in the transmission.

There is thus a need for a throttle which provides maximum throughput for traffic of different classes which respects Service Level Agreements but does not employ queues.

SUMMARY

It is an object of the present invention to formalise requirements and provide a method of measuring the goodness of mechanisms (how and what kind of requirements are met) and to provide a throttle accordingly.

In accordance with one aspect of the present invention there is provided a method of controlling overload in a telecommunications network (e.g. a NGN). A series of offers, each belonging to a traffic class selected from a set of traffic classes, are received at a throttle from one or more source nodes. The throttle identifies the traffic class of each offer, and an admission decision is carried out for each offer, the outcome of the admission decision determining whether or not that offer should be admitted into the network. For each offer, if the admission decision is to admit the offer, it is sent from the throttle towards a target node in the network. The admission decision for each offer takes into account the traffic class of that offer according to a Service Level Agreement.

Thus the throttle itself is an independent logical entity and treated by the source node as the target. The capacity of the throttle is determined and expressed as a rate that is an input of the decision algorithm.

The traffic offered to the throttle and the traffic admitted by the throttle should be explicitly measured on a per class basis. Thus every time $t_n$ an offer is received by the throttle, the throttle may calculate an incoming offer rate for each traffic class, the incoming offer rate being the rate at which offers of that traffic class are received by the throttle. The incoming offer rate $r_i(t_n)$ for each traffic class i may be calculated by:

$$r_i(t_n) = \max\{\chi_i(t_n)/T_i(t_n), (T_i(t_{n-1})r_i(t_{n-1}) - (t_n - t_{n-1})r_i(t_{n-1}) + \chi_i(t_n))/T_i(t_n)\}$$

where $T_i(t_n)$ is a configurable variable time period and $\chi_i(t_n)$ is a flag set to 1 for the traffic class of the received offer and 0 for all other traffic classes. If the throttle has a maximal throughput rate $c(t)$ and a (per-class) watermark $W_i$, $T_i(t_n)$ may be determined by $T_i(t_{n-1}) = T_i(t_n) = W_i/c(t)$.

Furthermore, every time $t_n$ an offer is received by the throttle, the throttle may calculates a provisional offer admission rate $a_i(t_n)$ for each traffic class i, the provisional offer admission rate being the rate at which offers of that traffic class are admitted by the throttle. The provisional offer admission rate for the traffic class of the received offer is calculated on the basis that the received offer is admitted by the throttle. As with the incoming offer rate, the provisional offer admission rate may be calculated by:

$$a_i(t_n) = \max\{\chi_i(t_n)/T_i(t_n), (T_i(t_{n-1})r_i(t_{n-1}) - (t_n - t_{n-1})r_i(t_{n-1}) + \chi_i(t_n))/T_i(t_n)\}$$

where $T_i(t)$ is a configurable variable time period and $\chi_i(t_n)$ is a flag set to 1 for the traffic class of the received offer and 0 for all other traffic classes. If the received offer is ultimately rejected by the throttle, the offer admission rate $a_i(t_n)$ may at that stage be recalculated for the traffic class i of the received offer with $\chi_i(t_n) = 0$.

In order to assist with the decision as to whether the offer should be admitted, the throttle may calculate a goal function $g_i(t_n)$ for the traffic class i of the received offer. The offer should then be admitted if $g_i(t_n) \geq a_i(t_n)$ and rejected if $g_i(t_n) < a_i(t_n)$. The goal function may be calculated using a used capacity $u(t_n)$ of the throttle by:

$$u(t_n) = \sum_{i=1}^{N} \begin{cases} r_i(t_n) & \text{if } r_i(t_n) \leq s_i c(t_n) \\ s_i c(t_n) & \text{otherwise} \end{cases}$$

$$g_i(t_n) = \begin{cases} s_i c(t_n) & \text{if } r_i(t_n) \leq s_i c(t_n), \\ s_i c(t_n) + \dfrac{(r_i(t_n) - s_i c(t_n))(c(t_n) - u(t_n))}{\left(\sum_{i=1}^{N} r_i(t_n)\right) - u(t_n)} & \text{otherwise} \end{cases}$$

where $s_i$ is the weight assigned to the traffic class i of the received offer by the Service Level Agreement.

Each offer will generally have a priority level selected from a set of priority levels. The throttle may identify the priority level of each offer, and the admission decision for each offer should take this into account so that higher priority offers are admitted in preference to lower priority offers. This may be achieved by calculating a per-class, per-priority offer admission rate $a_{i,j}(t_n)$ for all traffic classes i and priority levels j whenever an offer is received at the throttle. $a_{i,j}(t_n)$ should be calculated on the basis of a time period $T_j(t)$ that is smaller for higher priority levels than for lower priority levels. Alternatively, a per-class offer admission rate $a_i(t_n)$ for all traffic classes i may be calculated whenever an offer is received at the throttle using the priority level j of the received offer. In this case, $a_i(t_n)$ should be calculated on the basis of a time period $T_j(t)$ that is smaller for higher priority levels than for lower priority levels.

In a further alternative, the throttle may behave like a token bucket having a different Watermark $W_j$ for each priority level. In this case, the offer may be admitted if $g_i(t_n) \geq a_i(t_n) b(t_n)/W_j$ and rejected otherwise, where:

$g_i(t_n)$ is the goal function for the traffic class i of the received offer;

$b(t_n)$ is a function representing the size of the token bucket and is defined by $b(t_n) = \max\{1, b(t_{n-1}) - r(t_n - t_{n-1}) + 1\}$; and $r(t_n)$ is the calculated incoming offer rate.

The throttle may act as a proxy for the target node so that the network is hidden from the source node for the purposes of load control.

In accordance with another aspect of the present invention there is provided a throttle for controlling overload in a telecommunications network. The throttle comprises a receiver for receiving a series of offers from one or more source nodes. A processor is operatively connected to the receiver for carrying out an admission decision for each offer received, the outcome of the admission decision determining whether or not that offer should be admitted into the network. A transmitter is operatively connected to the processor for sending each offer into the network if the admission decision is to admit that offer.

The invention also provides an apparatus arranged to carry out the methods described above.

The requirements are thus formalised with objective functions whose domain is constituted by the throttle rate, the measures and external parameters such as the traffic shares defined in the Service Level Agreements. These objective functions are used to decide whether an offer should be admitted by the throttle. The decision strategies proposed are common in a sense that they all minimise the deviations from the requirements.

DETAILED DESCRIPTION

Figure 1:
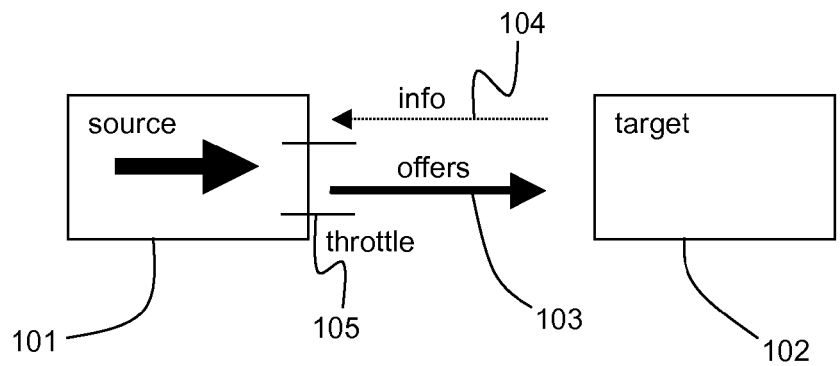
FIG. 1 is a schematic diagram illustrating an architecture for limiting the rate of offers in a network.
Figure 2:
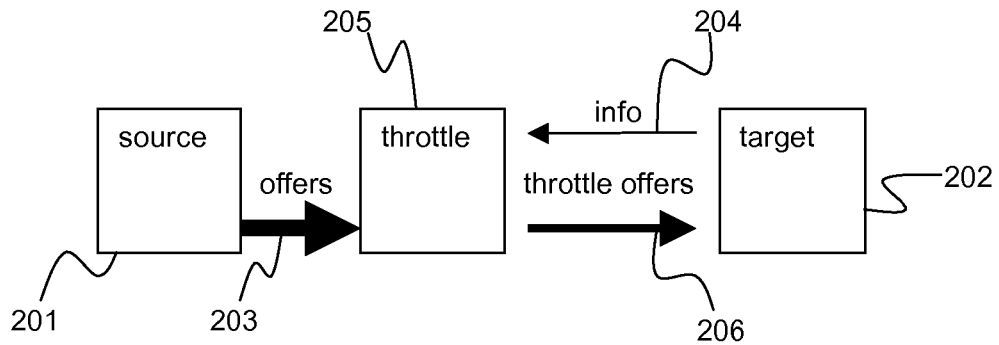
FIG. 2 is a schematic diagram illustrating an alternative architecture for limiting the rate of offers in a network.

FIG. 2 illustrates an architecture for limiting the rate of offers sent from a source node 201 towards a target node 202 using a throttle 205. The arrangement of FIG. 2 is similar to that of FIG. 1 except that the throttle 205 is an independent logical entity that need not be located in the source node 201. The throttle 205 is treated by the source node 201 as its target and is sent offers 203 by the source node, and it is the throttle 205 that decides whether or not these offers should be admitted. Offers that are admitted are sent 206 towards the target node 202; information is returned 204 from the target node 202 to the throttle 205. The capacity of the throttle is determined and expressed as a rate that is an input of the decision algorithm.

Figure 3:
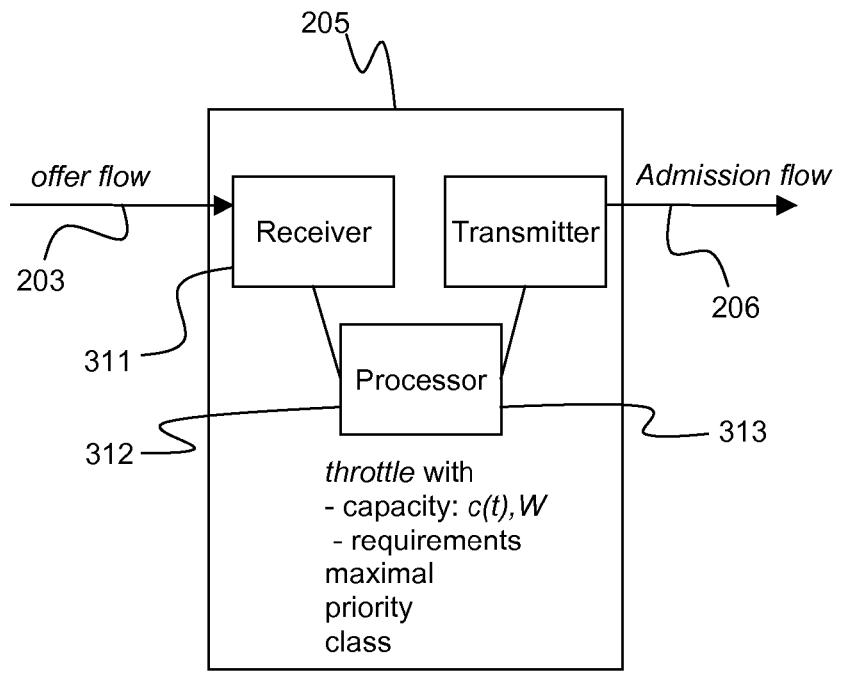
FIG. 3 is a schematic diagram illustrating a throttle.

FIG. 3 illustrates the throttle 205 in more detail. As previously mentioned, the throttle represents an individual functional entity or node in this system model, so it can be said that all requests, calls, packets or tasks named as offers are offered by the host node 201 to the throttle 205 in the first instance. The throttle 205 decides as to whether they should be sent out. In this arrangement, the throttle could be said to have a receiver 311 which receives offers from the source node 201, a processor 312 for making admission decisions, and a transmitter 313 for sending admitted offers towards the target node 202.

The throttle operates using a mathematical model, and definitions of the system elements and technical assumptions are as follows:

The throttle is a function mapping from an offer load point process to an {admission, rejection} decision. This function is characterised by a decision strategy, together with a rate capacity c(t) and a peak capacity W which are similar to those used by a Token Bucket. It can be assumed that that operating the decision strategy does not require any of the "designated" capacity (i.e. rate capacity or peak capacity).

An offer is an event for which the throttle must decide on admission or rejection. Admission and rejection are mutually exclusive: if an offer is admitted it cannot be rejected, and vice versa. An offer has the measurable properties of priority and class.

Offer load, or offered traffic, is the flow of offers characterised by a progressively measurable, not necessarily stationary, point process marked with the marks from the mark space that is the direct product of the set of priorities and classes. This implies that the probability of two offer events occurring at the same time is zero.

The class and the priority sets have finite elements.

Throughput or admitted traffic is the flow of admitted offers (i.e. the offers for which the throttle yields admission). The flow of admitted offers can be conditioned upon the whole history of the offer load flow and upon the throttle parameters.

It will be appreciated that these assumptions and definitions are only required to make the mathematical discussion clear. If they are violated, even if some of the following discussion is incorrect in theory, it will generally be the case that it still applies in practice.

It should be noted that, in this architecture, once an offer is dropped it is no longer sent to the target node 202. However, it can be re-sent by the source node 201, in which case the throttle 205 will need to make another decision as to whether it should be admitted or rejected. If this happens the two instances of the offer being sent are treated by the throttle 205 as two independent and individual offers. It is the role of the sender—i.e. the source node—to indicate the correlation. This can generally be achieved by using different priority or traffic class settings.

It will be noted that, in this architecture, the throttle 205 hides all the network from the source node 201 for the purposes of load control. In other words, the source node 201 might not even be aware of the existence of the throttle. For protocols that require specific replies the throttle can be used as a proxy for the target and construct replies itself.

It will be recalled from the discussion above that there are three requirements which should be met by the throttle, without queuing the traffic and introducing delay into the system. These requirements can be summed up as Req-1: maximal throughput;
Req-2: priority handling;
Req-3: traffic class shares.

Figure 4:
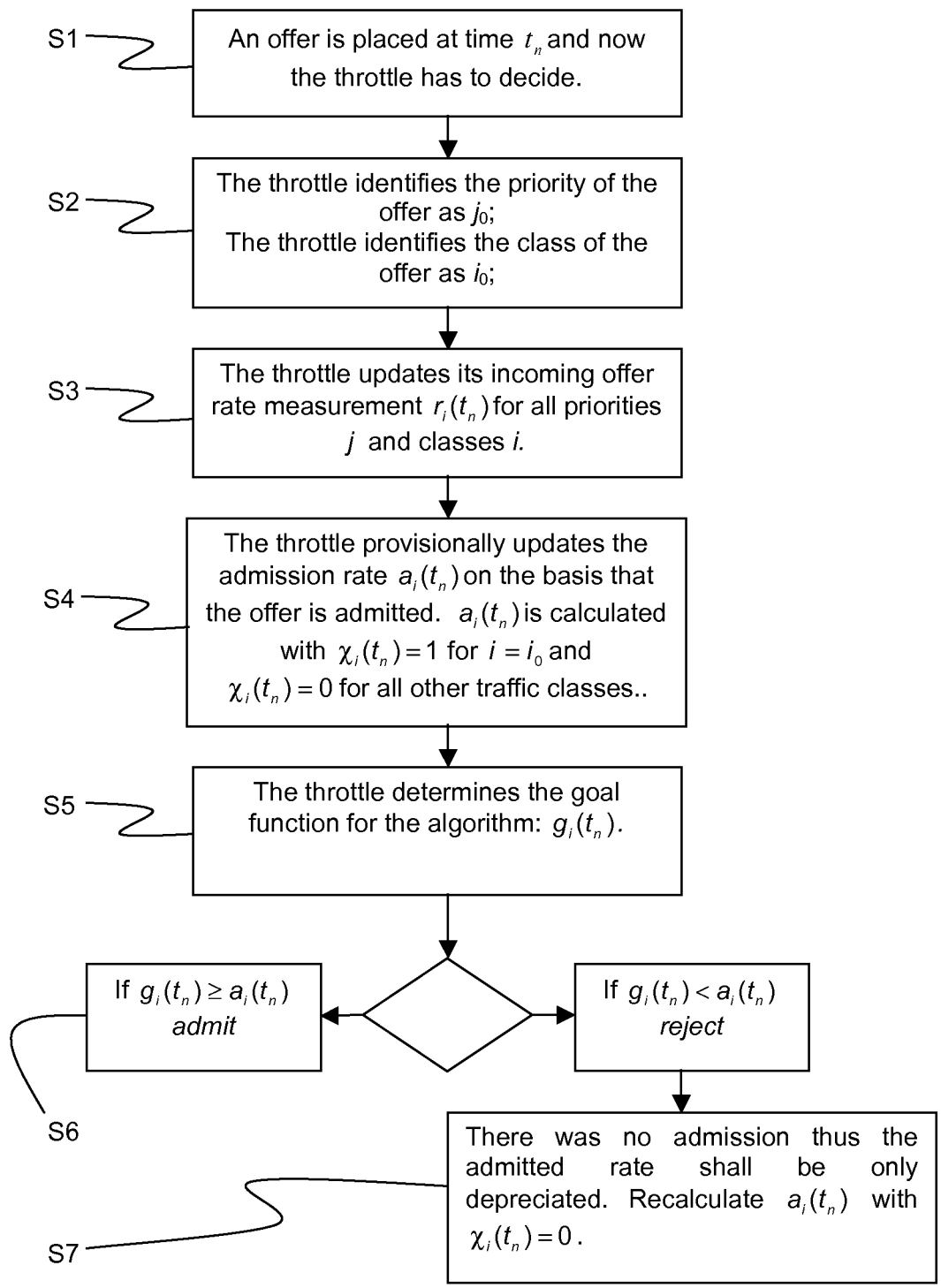
FIG. 4 is a flow diagram illustrating the actions carried out by the throttle of FIG. 3.

FIG. 4 is a flow chart illustrating the operation carried out by the throttle 205. The steps depicted in FIG. 4 can be understood with reference to the following details:

S1. At time $t_n$ an offer is received by the throttle 205 from the source node 201. The throttle must therefore make a decision: accept or reject. The previous offer event occurred at time $t_{n-1}$.

S2. The throttle 205 is aware of priority levels and traffic classes and can determine the class to which the offer belongs. Suppose the current offer belongs to traffic class $i_0$ with priority level $j_0$.

S3. An incoming offer rate vector $r_i(t_n)$ is calculated for all traffic classes i using an estimator described below. The calculation is carried out with the flag $\chi_i(t_n)=1$ for traffic class $i_0$, and $\chi_i(t_n)=0$ for all other traffic classes.

S4. A provisional admission rate vector $a_i(t_n)$ is calculated for all traffic classes using a further estimator described below. As with the offer rate vector, the calculation is carried out with $\chi_i(t_n)=1$ for class $i_0$, and $\chi_i(t_n)=0$ for all other traffic classes. At this stage, the admission rate is provisional because it is calculated on the basis that the offer is accepted, whether or not this is what ultimately happens.

S5. A goal function $g_i(t_n)$ is calculated as described below. The goal function is calculated only for $i=i_0$ i.e. only for the traffic class of the offer received at time $t_n$.

S6. An admission/rejection decision is made using the goal function and the provisional admission rate for the offer having class $i_0$. If the provisional admission rate for traffic in class $i_0$ is less than or equal to the goal function then the offer is accepted; otherwise it is rejected.

S7. If the offer was rejected than the admission rate for traffic class $i_c$, is recalculated using the previous value $a_i(t_{n-1})$ with $\chi_i(t_n)=0$ instead of $\chi_i(t_n)$, 1.

The identification of point processes, and especially Poisson processes commonly observed in telecommunications, is well known. Most identification systems use rate or intensity parameters as the most important descriptors. In many external load control algorithms these parameters are predetermined (e.g. received as information from the target node) but are not explicitly measured for the offered or the admitted flow.

The characterisation of a Poisson process with Token Bucket is good enough for most applications. However, in all previous overload control throttles the Token Bucket is used only to regulate traffic and not to measure its descriptors. In other words, once the traffic is regulated with a Token Bucket the operator cannot determine the offer rate in situations of under- or overload. All that can be identified is some distribution of the admission rate.

It is therefore necessary to provide feasible and simple estimators to measure the rate of the offered traffic and the admitted traffic. This greatly enhances the decisions taken by the external load control mechanism.

What is required is a measure of the intensity or rate of a non stationary point process. For the purposes of describing the estimator, suppose that in the time interval [t–T,t) there are k offers (or k admitted offers if the estimator is used to measure the admitted offer rate). In this case, let $N(t,t-T)$ be a counting process that returns this value k. Suppose that each offer arrives at the throttle at time $t_n$. There are a number of possible ways of determining the offer rate:

Simple average with fixed measure points: $r(t_n)=N(T_z,T_z-T)/T$. The number of offers is counted in regular intervals T between fixed time points $T_z$. In other words, the update of the rate $r(t)$ occurs at predefined times and is independent of the arrival of offers. The value is taken to be constant across each interval T.

Sliding average on T interval: $r(t_n)=N(t_n,t_n-T)/T$. The number of offers is counted in the interval T immediately preceding the offer arriving at time $t_n$. The value of $r(t)$ is then constant in the time interval $[t_{n-1},t_n)$. For example, all the events in the minute preceding the current time $t_n$ would be measured.

Sliding average on T(t) interval: $r(t_n)=N(t_n,t_n-T(t))/T(t)$. This needs to maintain the history of the process for a time-variable interval $T(t)$, which can cause trouble if $T(t)$ is not bounded or becomes too big (which is often the case). For example, $T(t)$ may be a stopping time such as "the time elapsed for the last N events". For example, the time needed for 1000 events to occur could be measured, and 1000 divided by this time.

Recursive sliding average:

$$r(t_n)=\max\{\chi(t_n)/(T(t_n),(T(t_{n-1})r(t_{n-1})-(t_n-t_{n-1})r(t_{n-1})+\chi(t_n))/T(t_n)\}.$$

$\chi(t_n)$ is a flag that can be set to 1 or 0 (following rules depending on the traffic class as explained above with reference to FIG. 4). This maintains only the previous $r(t_{n-1})$ and $T(t_{n-1})$ but often $T(t_{n-1}):=T(t_n)=W/c(t_n)$. In practice, $T(t_{n-})$ will be dependent on the priority level j; this is discussed in more detail below.

All the above definitions are unbiased in limit but with different efficiency. The first and the second (simple average and sliding average on T interval) are easy to understand and to implement, and are often practical if a setting is used such as $T_i$=every 1 sec and T=1. This would simply take the average number of offers every second. However, since their parameters are fixed they are unable to follow more frequent changes in traffic than T.

In the third definition (sliding average on T(t) interval) the number of events counted to generate an average rate is fixed, which is again computationally simple but again has the disadvantage that frequent changes in traffic rate may be missed.

The fourth definition (recursive sliding average) is useful and is the most appropriate for application in the process described with reference to FIG. 4. This approach has good statistical properties and is easy to compute. Furthermore, the system has to remember only $r(t_{n-1})$ and $T(t_{n-1})$—i.e. the rate and time period for one former event. The criteria by which $T(t_n)$ and $T(t_{n-1})$ should be chosen (to ensure that the admitted traffic has the desired characteristics) are discussed in more detail below.

In order to use the recursive sliding average it is necessary to specify $T(t_n)$ and $T(t_{n-1})$. If the desired admitted traffic were to have a shape bounded by a Token Bucket with parameters $c(t)$ for rate and W for watermark the best choice would be $T(t_{n-1})=T(t_n)=W/c(t)$. The throttle under discussion should limit the traffic in the same way.

The method is as follows:

The offer rate parameter—denoted by $r_i(t_n)$—is measured for each traffic class i. Any of the above approaches may be used but the recursive sliding average is particularly suitable due to its beneficial statistical properties and low complexity. Where the offer at time $t_n$ has traffic class $i=i_0$ then: for all other traffic classes $i \neq i_0$, $r_i(t_n)$ is calculated with $\chi(t_n)=0$ The admission rate parameter—denoted by $a_i(t_n)$—is also measured for each traffic class. It may even measured for each priority every time an offer is received, although this increases the computational burden. Methods are discussed below that do not require measurements for every priority class.

The requirements on the overload control mechanism can also be interpreted as requirements on the relation between the offered traffic and the admitted traffic. Each requirement is then defined as a goal function $g(t_n)$ and the decision logic is as follows:

Throttle(offer,$t_n$)=admission if $a(t_n) \leq g(t_n)$ and rejection otherwise.

[Req-1a] requires that the rate of admissions must not exceed the capacity of the throttle: i.e. $a(t_n) \leq c(t_n)$. The corresponding goal function is therefore $g(t_n)=c(t_n)$.

[Req-2] deals with the situation where there are two candidates for admission at any given time. The current discussion focuses on point processes where the probability of having two offers at the same time is zero, and this requirement therefore needs some additional extension and is discussed below.

[Req-3] ensures that admission by class satisfies sharing through SLA agreements. This can be interpreted as an allocation of a weight $s_i$ to each class i where $\Sigma s_i=1$. The corresponding goal function is then simply $g_i(t_n)=s_i c(t_n)$.

It will be noted that [req-1b] contradicts [req-3] since it requires that, if $\Sigma g_i=\Sigma r_i$, then no offer should be rejected. However, this is not true whenever there is a flow with $r_i(t_n)>0$ while $s_i c(t_n)>0$ and there is an offer of class j at any time $t_n$. Most of the time this situation does not arise and the contradiction does not need to be resolved. However, the problem still exists.

There is a number of ways to overcome this problem. One suitable approach is to extend the original requirements to include one of the following:

[Req-4.1]: If there is free capacity in the system after the Service Level Agreements have been met it should be divided between those traffic flows that require more capacity in proportion to their SLA weights.

[Req-4.2]: If there is free capacity in the system after the Service Level Agreements have been met it should be divided between those traffic flows that require more capacity in proportion to their offer rates.

Req-4.1 is likely to be more suitable and is implemented using per-class goal functions $g_i(t_n)$. The goal functions may be calculated using an intermediate function $u(t)$ which can be interpreted as the total "used capacity" of the throttle with strict traffic class share restrictions measured in the rate dimension:

$$u(t_n) = \sum_{i=1}^{N} \begin{cases} r_i(t_n) & \text{if } r_i(t_n) \leq s_i c(t_n) \\ s_i c(t_n) & \text{otherwise} \end{cases}$$

$$g_i(t_n) = \begin{cases} s_i c(t_n) & \text{if } r_i(t_n) \leq s_i c(t_n), \\ s_i c(t_n) + \dfrac{(r_i(t_n) - s_i c(t_n))(c(t_n) - u(t_n))}{\left(\sum_{i=1}^{N} r_i(t_n)\right) - u(t_n)} & \text{otherwise.} \end{cases}$$

As previously discussed, there is zero probability of having two candidate offers in the system at the same time since point processes are used. It is therefore necessary to ensure that priority is still handled correctly to ensure that [req-2] is met. It will be recalled that [req-2] requires that if two offers arrive "at the same time" the offer with the higher priority class is accepted first. [Req-2] must also therefore also specify a maximum time period which should be interpreted to mean "at the same time". In practice, priority handling to meet this requirement can be provided without further extending the method by suitable selection of the estimator time parameter settings. At least two approaches are possible: the second is computationally simpler and therefore likely to be more appropriate in practice.

Method 1. An individual value for $a_{i,j}(t)$ is measured for each priority level (and traffic class).

Suppose there is a total of J priority classes. Different throughput estimators may then be defined for each priority class j. Then $a_{i,j}(t)$ for higher priorities should be calculated using a smaller $T_j$ or $T_j(t_n)$ parameter. This means that the system "forgets" a recent high load more quickly for high priority traffic. In other words, the definitions of the estimators for each priority level should be modified with appropriate $T_j$ and $T_j(t_n)$. This approach requires high processing because $a_{i,j}(t)$ must be calculated for all combinations of priority level and traffic class every time an offer is received by the throttle.

Method 2. One value of $a_i(t)$ is measured for all priority levels. However, the calculation of $a_i(t)$ is dependent on the priority level j of the offer received by the throttle.

The estimators for throughput rate are extended as follows to provide priority handling:

Sliding average on $T_j(t_n)$ interval: $a(t_n) = N(t_n, t_n - T_j(t))/T_j(t)$ with different $T_j(t_n)$ values for each class.

Recursive sliding average:

$$a(t_n) = \max\{\chi(t_n)/T(t_n), (T(t_{n-1})a(t_{n-1}) - (t_n - t_{n-1})a(t_{n-1}) + \chi(t_n))/T(t_n)\}$$

where $T(t_n) = W_j/c(t_n)$. This maintains only the previous value and $T(t_{n-1}) = W_k/c(t_{n-1})$ where $W_j$ and $W_k$ are "watermark-like" constants for the previous and the current offers.

With this method the throughput measurement is not the same for all priority levels. An incoming offer with a high large priority results in a set of calculations of $a_i(t)$ with a relatively small weight. This means that, when there is an overload of offers in the system and the throttle has to reject many calls, then the higher priority offers are more likely to get through if there is a gap since the high load in the past is forgotten more quickly. Recent high rate information is "forgotten" more quickly. A further extension to the throttle described above may therefore be more appropriate for priority handling. This may be considered as a "Token Bucket" extension to the throttle.

The most common model for telecommunications traffic is the point process. Up to this point in the discussion the throttle has been characterised by its rate capacity $c(t)$ the admission rate, $a(t)$ is limited) and watermark W. If the rate limit (or the measure it is compared with) does not depend on the priority level there should always be reserved capacity if req-2 is to be met, and this will violate req-1b. This cannot be resolved without further extension given that the estimators do not depend on the priority levels.

One solution is similar to the Token Bucket and resolves the priority handling problem by the proposal of new requirements in a similar manner to the previous case of traffic classes. In the Token Bucket concept this extra requirement of different throttle characteristics for different priorities is provided by defining different watermark levels $W_j$—i.e. a throttle with different capacity for each priority level. It will be noted that this also implies different rate distribution for different priority traffic, but the average rate will be less then the bucket rate.

The approach described above can therefore be extended using the Token Bucket as follows:

The token bucket decision is:

Throttle(offer;bucket)=admission if $W_j \leq b(t_n)$ and rejection otherwise, where $b(t_n) = \max\{1, b(t_{n-1}) - c(t)(t_n - t_{n-1}) + 1\}$ is the bucket size and $W_j$ is the watermark for the offer flow of priority j on condition that the offer was type j.

The throttle described herein can be extended with a decision that is almost equivalent: Throttle(offer)=admission if $g_i(t_n) \geq a_i(t_n)b(t_n)/W_j$ and rejection otherwise, where $a(t_n)$ is calculated exactly the same way as in using $W_j$ as watermarks.

It is instructive to consider some of the interesting combinations of the requirements. These are represented in the following table with the possible solutions listed solving each requirement combination.

| Requirements: | Solutions exist with methods: |
| --- | --- |
| Req-1: maximal throughput | Token Bucket |
| | New throttle |
| Req-1 + Req-2: maximal throughput with priorities | Token Bucket |
| | New throttle |
| | New throttle combined with Token Bucket |
| Req-1 + Req-3: maximal throughput with traffic class shares | Weighted Fair Queuing (uses queues) |
| | Generalized Processor Sharing |
| | New throttle (does not use Queues) |
| | New throttle with Token Bucket (no queues) |
| Req-1 + Req-2 + Req-3: maximal throughput with priority handling and traffic class shares | New throttle (does not use Queues) |
| | New throttle with Token Bucket (no queues) |

The decision strategy described above solves the problem of throughput fairness and priority handling while maximising throughput. It is close in characteristics to a token bucket with given parameters on an aggregate level.

The new throttle with token bucket extension can be tested using a stream fairness algorithm.

The stream fairness algorithm controls the different traffic streams (POTS originating, POTS terminating, ISDN originating, ISDN terminating) separately. Each stream has a different traffic class i. Depending on the setting of the control options "Control_POTS_orig" and "Control_ISDN_orig", the number of controlled streams can actually be 2, 3 or 4.

Figure 5:
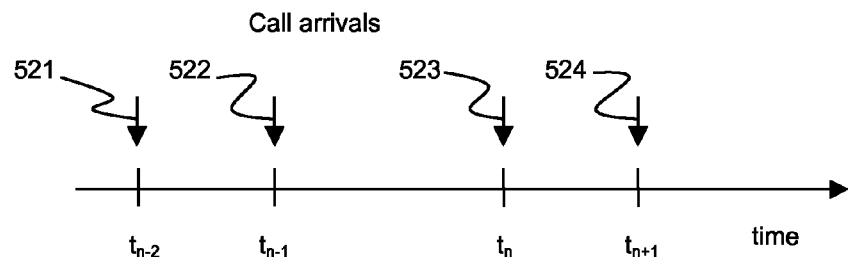
FIG. 5 illustrates four call arrivals which may come from different streams (traffic classes)

As an input to the admission decision, the stream fairness algorithm must measure some statistics for each controlled stream. As illustrated in FIG. 5, all the measurement parameters (b, $r_i$ and $a_i$) are updated at each call arrival 521, 522, 523, 524 ($r_i$ and $a_i$ shall be updated for all streams at all arrivals, not only for the stream of the arrival).

It will be noted that only the streams that are under control should be measured (depending on the settings of Control_POTS_orig and Control_ISDN_orig). In the following, N denotes the number of controlled streams, i.e. N can be 2, 3 or 4.

Mean call rate for stream i is updated when a new call request arrives at time $t_n$:

$$r_i(t_n) = \begin{cases} \dfrac{\frac{W_j}{LR(t_n)} r_i(t_{n-1}) - (t_n - t_{n-1}) r_i(t_{n-1}) + \rho_i(t_n)}{\frac{W_j}{LR(t_n)}} & \text{if } \frac{W_j}{LR(t_n)} > t_n - t_{n-1} \\ \dfrac{LR(t_n)}{W_j} & \text{otherwise.} \end{cases}$$

As before, j is the priority of the call and $W_j$ means the bucket watermark belonging to priority j. $LR(t_n)$ is the actual leak rate provided by the H.248.11 algorithm. $\rho_i(t_n)$ means that there was a call arrival for stream i at time $t_n$, i.e.:

$$\rho_i(t_n) = \begin{cases} 1 & \text{if there was a call arrival for stream } i \text{ at time } t_n \\ 0 & \text{otherwise} \end{cases}$$

Admitted call rate of stream i is calculated at $t_n$ as:

$$a_i(t_n) = \begin{cases} \dfrac{\frac{W_j}{LR(t_n)} a_i(t_{n-1}) - (t_n - t_{n-1}) a_i(t_{n-1})}{\frac{W_j}{LR(t_n)}} & \text{if } \frac{W_j}{LR(t_n)} > t_n - t_{n-1} \\ \dfrac{LR(t_n)}{W_j} & \text{otherwise.} \end{cases}$$

Bucket fill is calculated at $t_n$ as in the design base:

$$b(t_n) = \begin{cases} b(t_{n-1}) - (t_n - t_{n-1})LR(t_n) & \text{if } b(t_{n-1}) > (t_n - t_{n-1})LR(t_n) \\ 0 & \text{otherwise.} \end{cases}$$

At each call arrival, the used capacity is calculated as:

$$u(t_n) = \sum_{i=1}^{N} \begin{cases} r_i(t_n) & \text{if } r_i(t_n) \leq s_i LR(t_n) \\ s_i LR(t_n) & \text{otherwise} \end{cases}$$

where $s_i$ is the normalized weight of stream i:

$$s_i = \frac{Weight_i}{\sum_{j=1}^{N} Weight_j}.$$

The call of stream i and priority j shall be admitted at time $t_n$ only if:

$$\frac{b(t_n)}{W_j} a_i(t_n) \leq \begin{cases} s_i LR(t_n) & \text{if } r_i(t_n) \leq s_i LR(t_n), \\ s_i LR(t_n) + \dfrac{(r_i(t_n) - s_i LR(t_n))(LR(t_n) - u(t_n))}{\left(\sum_{i=1}^{N} r_i(t_n)\right) - u(t_n)} & \text{otherwise.} \end{cases}$$

It will be appreciated that this is similar to the admission criterion described above where Throttle(offer)=admission if $g_i(t_n) \geq a_i(t_n)b(t_n)/W_j$ and rejection otherwise.

If the admission criterion is fulfilled, then the call shall be accepted, and the following parameters shall be updated as:

$$a_i(t_n) = a_i(t_n) + \frac{LR(t_n)}{W_j}$$

(only for stream i that has a call admitted at time $t_n$)

$$b(t_n) = b(t_n) + 1$$

If the admission criterion is not fulfilled, then the call shall be rejected. The following discussion considers a very simple overload scenario, and a complex one, with overload and no overload situations.

Traffic Descriptors:
  Portion of offers per traffic class: 0.1, 0.5, 0.4
  Portion of offers per priority: ¼, ¼, ¼, ¼
  Aggregate offer rate:
Algorithm Settings:
  Throttle capacity c(t)=1
  Watermarks and W parameters (same for all the methods): 10, 15, 20, 25
  The estimators are as described with reference to FIG. 4, with the token bucket extension described above.

The result is analyzed on a fixed trajectory of random Poisson traffic (random is seeded).

Figure 6:
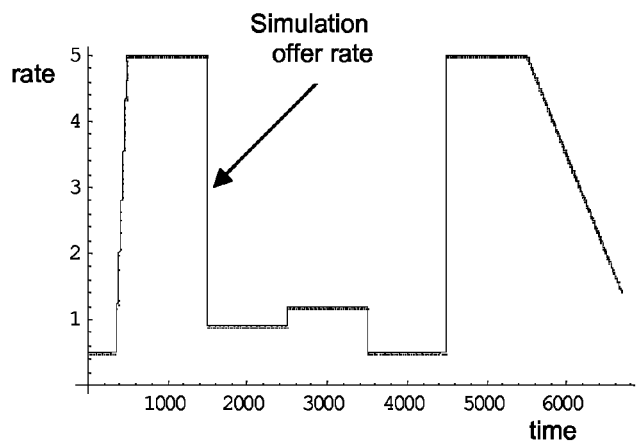
FIG. 6 illustrates a simulation of an aggregate offer rate against time.

The effect of different methods on aggregate level can now be compared. The offer rate setting for the simulation is illustrated in FIG. 6. The horizontal axis shows time while the offer rate is measured on the vertical axis.

Figure 7:
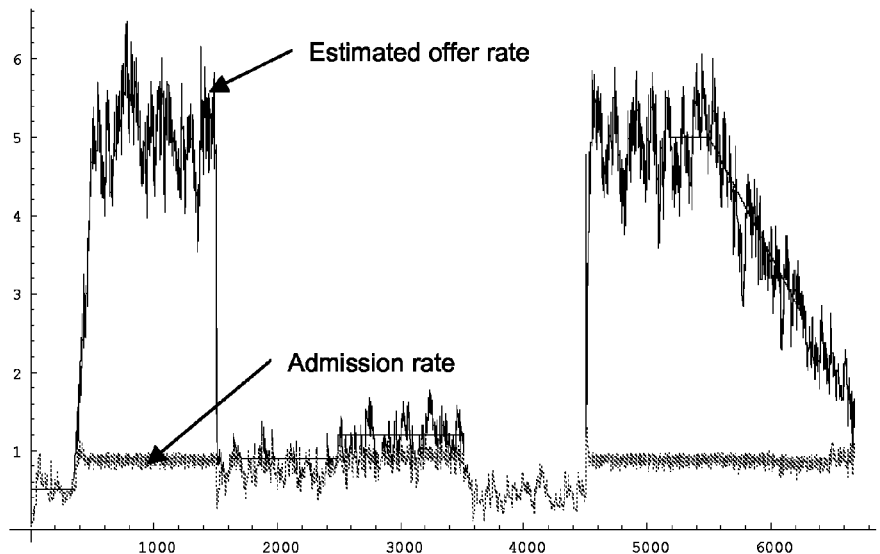
FIG. 7 illustrates the estimated offer rate and admission rate for the simulation of FIG. 6 for a token bucket throttle.
Figure 8:
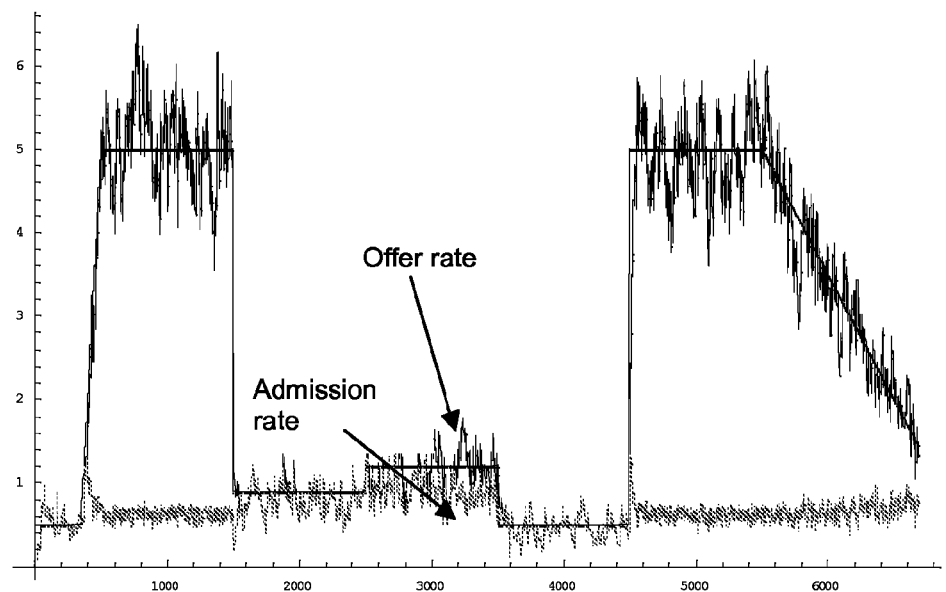
FIG. 8 illustrates the estimated offer rate and admission rate for the simulation of FIG. 6 for a rate based call gapping throttle.
Figure 9:
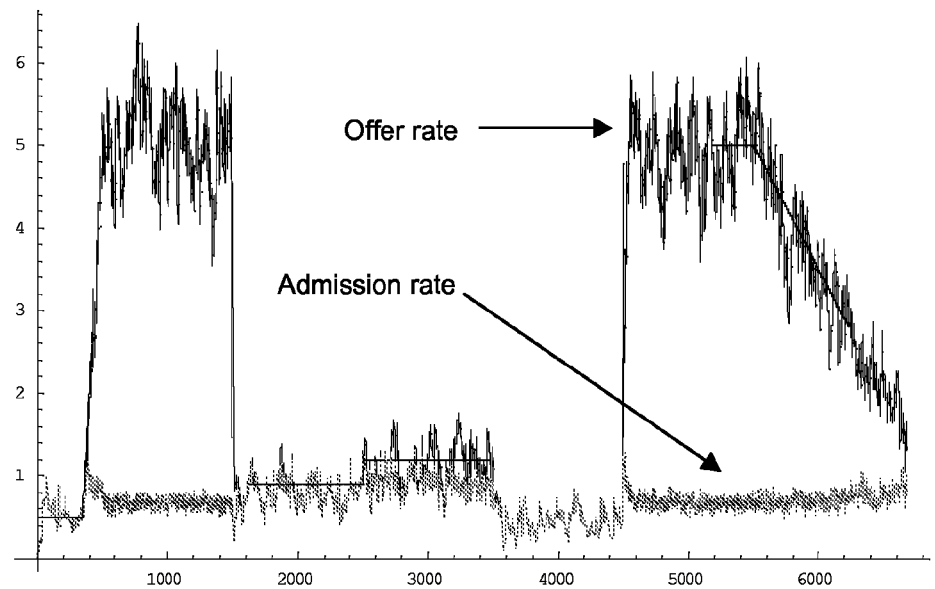
FIG. 9 illustrates the estimated offer rate and admission rate for the simulation of FIG. 6 for a rate based call gapping throttle extended using the token bucket.

FIGS. 7, 8 and 9 respectively illustrate the estimated offer rate and admission rate for the new throttle, a traditional token bucket, and the new throttle combined with the token bucket. It is clear that the three different mechanisms do not differ greatly on aggregate level.

It is interesting to see how the algorithms perform in total. For this a number of counters are specified and reported for each method:

| | method | | |
|---|---|---|---|
| | New throttle | Token Bucket | New throttle with the Token Bucket |
| Total number of offers | 17000 | 17000 | 17000 |
| Total number of throughputs | 5939 | 5869 | 5873 |
| Average aggregate throughput rate | 0.888585 | 0.878112 | 0.878711 |
| Total number of rejects | 11061 | 11131 | 11127 |
| Number of offers per class | 1722, 8478, 6800 | 1722, 8478, 6800 | 1722, 8478, 6800 |
| Number of throughputs per class | 517, 1539, 3883 | 596, 2903, 2370 | 538, 1709, 3626 |
| Weight of admissions per class | 0.08, 0.25, 0.65 | 0.1, 0.49, 0.4 | 0.09, 0.29, 0.61 |
| Average throughput rate per class | 0.077, 0.23, 0.58 | 0.089, 0.43, 0.35 | 0.08, 0.25, 0.54 |
| Number of throughputs per priority level | 981, 1295, 1593, 2133 | 515, 734, 969, 3651 | 558, 878, 1668, 2769 |
| Average throughput rate per priority level | 0.13, 0.19, 0.23, 0.31 | 0.07, 0.1, 0.14, 0.54 | 0.08, 0.13, 0.24, 0.41 |

The average throughput rate is one important measure on the goodness of the methods. It is thought that the better characteristics of the new throttle are likely to arise because it follows the rate changes more precisely than the token bucket.

Some differences are apparent in the "Weight of admissions per class". In the case of the token bucket the weights are similar to the weights of the classes in the offered traffic while the other two tends towards the SLA (as required). A correct match is not found since, if there is no overload, some classes may use the capacity share of others: this satisfies req-1 without violating req-3.

If one examines the "Average throughput rate per priority classes" it can be seen that the new throttle extended with a token bucket handles the priorities more like a token bucket.

A particular advantage of the proposed throttle is that it is the first that meets all the basic requirements. (H.248.11). Previously different approaches satisfied different requirements: the "Leaky bucket" provides maximal throughput and priority handling, whereas Weighted Fair Queuing can provide Service Level Agreements with Queuing. The new throttle does not use queues and maximizes the used capacity while providing Service Level Agreements. Furthermore, the algorithms employed are simple and do not require large processing power. Since the mechanism relies on exact mathematical definitions the parameters can be set to obtain the optimal (or at least defined and well known) performance.

It will be appreciated that variations from the above described embodiments may still fall within the scope of the invention, which is defined in the accompanying claims.

The invention claimed is:

1. A method of controlling overload in a telecommunications network, comprising:
at a throttle, receiving a series of offers from one or more source nodes, each offer belonging to a traffic class i selected from a set of traffic classes and having a separate priority level j selected from a set of priority levels;
identifying the traffic class of each offer;
carrying out an admission decision for each offer, the outcome of the admission decision determining whether or not that offer should be admitted into the network, the admission decision for each offer taking into account the traffic class of that offer according to a Service Level Agreement;
for each offer, if the admission decision is to admit the offer, sending the offer from the throttle towards a target node in the network.

2. The method of claim 1, wherein, every time $t_n$, an offer is received by the throttle, the throttle calculates an incoming offer rate for each traffic class, the incoming offer rate being the rate at which offers of that traffic class are received by the throttle.

3. he method of claim 2, wherein the incoming offer rate $r_i(t_n)$ for each traffic class i is calculated when an offer is received by the throttle at time $t_n$ by:

$$r_i(t_n) = \max\{\chi_i(t_n)/T_i(t_n), (T_i(t_{n-1})r_i(t_{n-1})-(t_n-t_{n-1})r_i(t_{n-1})+\chi_i(t_n))/T_i(t_n)\}$$

where $T_i(t)$ is a configurable variable time period and $\chi_i(t_n)$ is a flag set to 1 for the traffic class of the received offer and 0 for all other traffic classes.

4. The method of claim 3, wherein the throttle has defined a maximal throughput rate c(t) and has further defined a watermark $W_i$ for each traffic class i, and wherein $T_i(t_{n-1}) = T_i(t_n) = W_i/c(t)$.

5. The method of claim 1, wherein, every time $t_n$ an offer is received by the throttle, the throttle calculates a provisional offer admission rate $a_i(t_n)$ for each traffic class i, the provisional offer admission rate being the rate at which offers of that traffic class are admitted by the throttle, the provisional offer admission rate for the traffic class of the received offer being calculated on the basis that the received offer is admitted by the throttle.

6. The method of claim 5, wherein the provisional offer admission rate $a_i(t_n)$ for each traffic class i is calculated when an offer is received by the throttle at time $t_n$ by:

$a_i(t_n)=\max\{\chi_i(t_n)/T_i(t_n),(T_i(t_{n-1})r_i(t_{n-1})-(t_n-t_{n-1})r_i(t_{n-1})+\chi_i(t_n))/T_i(t_n)\}$ where $T_i(t)$ is a configurable variable time period and $\chi_i(t_n)$ is a flag set to 1 for the traffic class of the received offer and 0 for all other traffic classes.

7. The method of claim 5, wherein, every time $t_n$ an offer is received at the throttle, the throttle calculates a goal function $g_i(t_n)$ for the traffic class i of the received offer, admits the offer if $g_i(t_n) \geq a_i(t_n)$ and rejects the offer if $g_i(t_n) < a_i(t_n)$.

8. The method of claim 7, wherein the goal function $g_i(t_n)$ of the received offer is calculated using a used capacity $u(t_n)$ of the throttle by:

$$u(t_n) = \sum_{i=1}^{N} \begin{cases} r_i(t_n) \\ s_i c(t_n) \end{cases}$$

if $r_i(t_n) \leq s_i c(t_n)$ otherwise $$g_i(t_n) = \begin{cases} s_i c(t_n) & \text{if } r_i(t_n) \leq s_i c(t_n), \\ s_i c(t_n) + \dfrac{(r_i(t_n) - s_i c(t_n))(c(t_n) - u(t_n))}{\left(\sum_{i=1}^{N} r_i(t_n)\right) - u(t_n)} & \text{otherwise} \end{cases}$$

where $s_i$ is the weight assigned to the traffic class i of the received offer by the Service Level Agreement.

9. The method of claim 5, wherein, if the received offer is rejected by the throttle, the offer admission rate $a_i(t_n)$ is recalculated for the traffic class i of the received offer with $\chi_i(t_n)=0$.

10. The method of claim 5, wherein:
the throttle identifies the priority level of each offer; and
the admission decision for each offer takes into account the priority level of that offer so that higher priority offers are admitted in preference to lower priority offers.

11. The method of claim 10, wherein the throttle admits higher priority offers in preference to lower priority offers by calculating a per-class, per-priority offer admission rate $a_{i,j}(t_n)$ for all traffic classes i and priority levels j whenever an offer is received at the throttle, $a_{i,j}(t_n)$ being calculated on the basis of a time period $T_j(t)$ that is smaller for higher priority levels than for lower priority levels.

12. The method of claim 10, wherein the throttle admits higher priority offers in preference to lower priority offers by calculating, on the basis of the priority level j of the received offer, a per-class offer admission rate $a_{i,j}(t_n)$ for all traffic classes i whenever an offer is received at the throttle, $a_{i,j}(t_n)$ being calculated on the basis of a time period $T_j(t)$ that is smaller for higher priority levels than for lower priority levels.

13. The method of claim 10, wherein the throttle behaves like a token bucket having a different Watermark $W_j$ for each priority level.

14. The method of claim 13, wherein the offer is admitted if $g_i(t_n) \geq a_i(t_n)b(t_n)/W_j$ and rejected otherwise, where:
$g_{i,j}(t_n)$ is the goal function for the traffic class i of the received offer;
$b(t_n)$ is a function representing the size of the token bucket and is defined by
$b(t_n)=\max\{1,b(t_{n-1})-c(t)(t_n-t_{n-1})+1\}$; and
$c(t)$ is the capacity of the throttle.

15. The method of claim 1, wherein the throttle acts as a proxy for the target node so that the network is hidden from the source node for the purposes of load control.

16. Apparatus arranged to carry out the method of claim 1.

17. A throttle for controlling overload in a telecommunications network, comprising:
a receiver adapted to receive a series of offers from one or more source nodes, each offer belonging to a traffic class i selected from a set of traffic classes and having a separate priority level j selected from a set of priority levels;
a processor, operatively connected to the receiver, adapted to identify the traffic class of each offer and carry out an admission decision for each offer received, the admission decision for each offer taking into account the traffic class of that offer according to a Service Level Agreement and the outcome of the admission decision determining whether or not that offer should be admitted into the network; and
a transmitter, operatively connected to the processor, for sending each offer into the network if the admission decision is to admit that offer.

18. The throttle of claim 17, wherein the processor is arranged to calculate an incoming offer rate for every traffic class i every time $t_n$ an offer is received by the throttle, the incoming offer rate for each traffic class being the rate at which offers of that traffic class are received by the throttle.

19. The throttle of claim 18, wherein the processor is arranged to calculate the incoming offer rate $r_i(t_n)$ for each traffic class i when an offer is received by the throttle at time $t_n$ by:
$r_i(t_n)=\max\{\chi_i(t_n)/T_i(t_n),(T_i(t_{n-1})r_i(t_{n-1})-(t_n-t_{n-1})r_i(t_{n-1})+\chi_i(t_n))/T_i(t_n)\}$ where $T_i(t)$ is a configurable variable time period and $\chi_i(t_n)$ is a flag set to 1 for the traffic class of the received offer and 0 for all other traffic classes.

20. The throttle of claim 19, having defined a maximal throughput rate $c(t)$ and, for each traffic class i, a watermark $W_i$, and wherein $T_i(t_{n-1})=T_i(t_n)=W_i/c(t)$.

21. The throttle of any of claim 17, wherein the processor is arranged to calculate a provisional offer admission rate $a_i(t_n)$ for each traffic class i every time $t_n$ an offer is received by the throttle, the provisional offer admission rate being the rate at which offers of that traffic class are admitted by the throttle, the provisional offer admission rate for the traffic class of the received offer being calculated on the basis that the received offer is admitted by the throttle.

22. The throttle of claim 21, wherein the processor is arranged to calculate the provisional offer admission rate $a_i(t_n)$ for each traffic class i when an offer is received by the throttle at time $t_n$ by:
$a_i(t_n)=\max\{\chi_i(t_n)/T_i(t_n),(T_i(t_{n-1})r_i(t_{n-1})-(t_n-t_{n-1})r_i(t_{n-1})+\chi_i(t_n))/T_i(t_n)\}$ where is a $T_i(t)$ is a configurable variable time period and $\chi_i(t_n)$ is a flag set to 1 for the traffic class of the received offer and 0 for all other traffic classes.

23. The throttle of claim 21, wherein the processor is arranged, every time $t_n$ an offer is received at the throttle, to:
calculate a goal function $g_i(t_n)$ for the traffic class i of the received offer;
admit the offer if $g_i(t_n) \geq a_i(t_n)$; and
reject the offer if $g_i(t_n) < a_i(t_n)$.

24. The throttle of claim 23, wherein the processor is arranged to calculate the goal function $g_i(t_n)$ of the received offer using a used capacity $u(t_n)$ of the throttle by:

$$u(t_n) = \sum_{i=1}^{N} \begin{cases} r_i(t_n) & \text{if } r_i(t_n) \leq s_i c(t_n) \\ s_i c(t_n) & \text{otherwise} \end{cases}$$

-continued $$g_i(t_n) = \begin{cases} s_i c(t_n) & \text{if } r_i(t_n) \le s_i c(t_n), \\ s_i c(t_n) + \dfrac{(r_i(t_n) - s_i c(t_n))(c(t_n) - u(t_n))}{\left(\sum_{i=1}^{N} r_i(t_n)\right) - u(t_n)} & \text{otherwise} \end{cases}$$

where $s_i$ is the weight assigned to the traffic class i of the received offer by the Service Level Agreement.

25. The throttle of claim 21, wherein the processor is arranged so that, if the received offer is rejected by the throttle, the offer admission rate $a_i(t_n)$ is recalculated for the traffic class i of the received offer with $\chi_i(t_n)=0$.

26. The throttle of claim 17, wherein:
the processor is arranged to identify the priority level of each offer; and
the admission decision for each offer takes into account the priority level of that offer so that higher priority offers are admitted in preference to lower priority offers.

27. The throttle of claim 26, wherein the processor is arranged to admit higher priority offers in preference to lower priority offers by calculating a per-class, per-priority offer admission rate $a_{i,j}(t_n)$ for all traffic classes i and priority levels j whenever an offer is received at the throttle, $a_{i,j}(t_n)$ being calculated on the basis of a time period $T_j(t)$ that is smaller for higher priority levels than for lower priority levels.

28. The throttle of claim 26, wherein the processor is arranged to admit higher priority offers in preference to lower priority offers by calculating, on the basis of the priority level j of the received offer, a per-class offer admission rate $a_{i,}(t_n)$ for all traffic classes i whenever an offer is received at the throttle, $a_{i,}(t_n)$ being calculated on the basis of a time period $T_j(t)$ that is smaller for higher priority levels than for lower priority levels.

29. The throttle of claim 26, arranged to behave like a token bucket having a different Watermark $W_j$ for each priority level.

30. The throttle of claim 29, wherein the processor is arranged so that the offer is admitted if $g_i(t_n) \geq a_i(t_n)b(t_n)/W_j$ and rejected otherwise, where:
$g_i(t_n)$ is the goal function for the traffic class i of the received offer;
$b(t_n)$ is a function representing the size of the token bucket and is defined by
$b(t_n) = \max\{1, b(t_{n-1}) - c(t)(t_n - t_{n-1}) + 1\}$; and
$c(t)$ is the capacity of the throttle.

31. The throttle of any of claim 17, arranged to act as a proxy for the target node so that the network is hidden from the source node for the purposes of load control.

* * * * *

UNITED STATES PATENT AND TRADEMARK OFFICE
CERTIFICATE OF CORRECTION

PATENT NO. : 8,432,798 B2  
APPLICATION NO. : 13/055506  
DATED : April 30, 2013  
INVENTOR(S) : Kovacs Page 1 of 1

It is certified that error appears in the above-identified patent and that said Letters Patent is hereby corrected as shown below:

In the Specification

In Column 5, Line 38, delete "host node" and insert -- source node --, therefor.

In Column 6, Line 49, delete "$a_j(t_n)$" and insert -- $a_i(t_n)$ --, therefor.

In Column 7, Line 23, delete "[t-T,t)" and insert -- (t-T,t) --, therefor.

In Column 7, Line 58, delete "$T(t_{n\text{-}})$" and insert -- $T(T_{n-1})$ --, therefor.

In Column 10, Lines 14-15, delete "the admission rate, a(t) is limited)" and insert -- (i.e. the admission rate, a(t) is limited) --, therefor.

In the Claims

In Column 14, Line 40, in Claim 2, delete "$t_n$," and insert -- $t_n$ --, therefor.

In Column 14, Line 45, in Claim 3, delete "he" and insert -- The --, therefor.

In Column 15, Line 28, in Claim 8, delete "$S_i$," and insert -- $S_i$ --, therefor.

In Column 16, Line 37, in Claim 21, delete "of any of claim" and insert -- of claim --, therefor.

In Column 16, Line 50, in Claim 22, delete "where is a" and insert -- where --, therefor.

In Column 18, Line 22, in Claim 31, delete "of any of claim" and insert -- of claim --, therefor.

Signed and Sealed this  
Fifth Day of November, 2013

Teresa Stanek Rea  
*Deputy Director of the United States Patent and Trademark Office*